United States Patent [19]

Bergen

[11] 4,141,337
[45] Feb. 27, 1979

[54] SOLAR WINDOW UNIT

[75] Inventor: Bernard J. Bergen, Vinton, Iowa

[73] Assignee: Addison Products Company, Addison, Mich.

[21] Appl. No.: 826,140

[22] Filed: Aug. 19, 1977

[51] Int. Cl.² .............................................. F24J 3/02
[52] U.S. Cl. .................................... 126/270; 237/1 A
[58] Field of Search ................ 126/270, 271; 237/1 A

[56] References Cited

U.S. PATENT DOCUMENTS

| 3,863,621 | 2/1975 | Schoenfelder | 237/1 |
| 4,059,226 | 11/1977 | Atkinson | 126/270 |
| 4,061,129 | 12/1977 | Wilson | 126/270 |
| 4,066,118 | 1/1978 | Goettl | 126/270 |

Primary Examiner—Kenneth W. Sprague
Attorney, Agent, or Firm—John A. Brady

[57] ABSTRACT

A window unit for heating a room with solar heat comprising a heat collector section and a heat storage section. A three position fan directs air either from the collector to the interior, from the collector to the store, or from the store to the interior.

9 Claims, 4 Drawing Figures

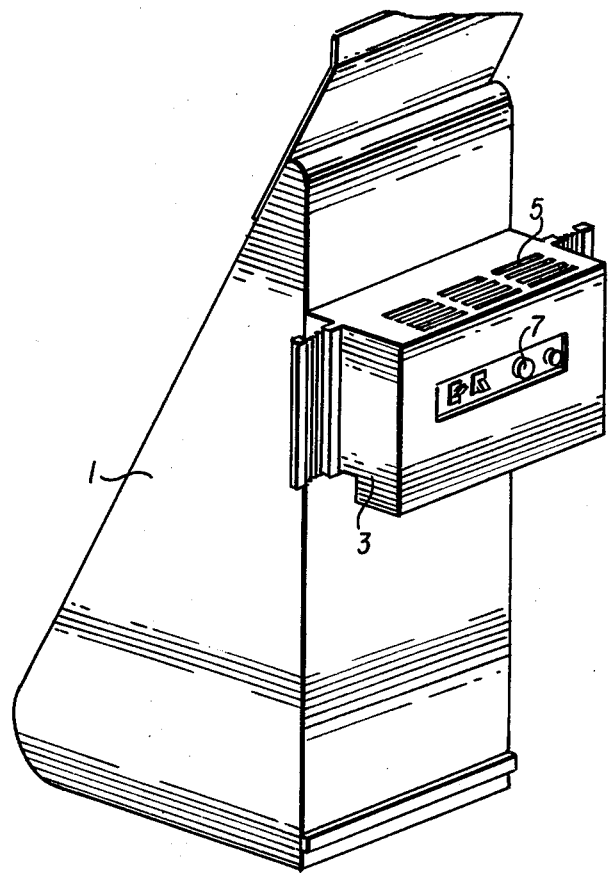
FIG. 1
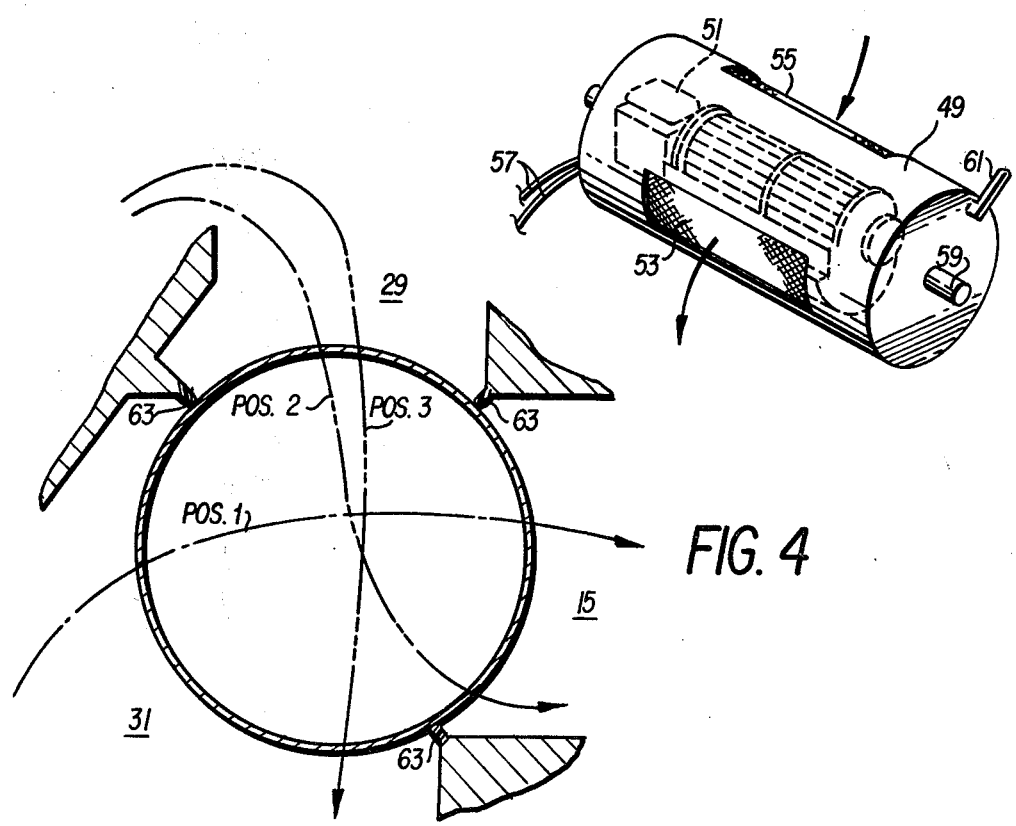
FIG. 3
FIG. 4

SOLAR WINDOW UNIT

BACKGROUND OF THE INVENTION

This invention relates to heating dwellings and other structures by sunlight.

Heating by sunlight has a number of inherent, well-recognized advantages, particularly resulting because solar systems do not generally produce air pollutant nor do they consume any limited natural resource. Typically in solar systems a dark object is placed in a heat-insulative container which admits sunlight. The sun rays are converted to heat by the dark object and are trapped by the insulation.

Where a solar system is not installed for use in an entire building, use of a single unit for a room is desirable as it makes possible the use of solar energy for heating and its consequent advantages. This invention is concerned with units which may be attached to the outside of a building through a conventional window.

Although the construction of a solar collector in assocation with a window or the like is known in the prior art, such as disclosed in U.S. Pat. Nos. 246,626 to Morse and 2,931,578 to Thompson, no prior art is known employing a heat-storage section in such a unit. A heat-storage section is a basic element of the instant invention. Consequently, the known prior art is believed to be relevant only in the most general sense. The foregoing patent to Morse is the most relevant in that it shows a wall collector unit having hinged covers which may be positioned to direct air from the interior to or from the outside of the building or to circulate air through the collector and back to the interior.

SUMMARY OF THE INVENTION

The invention comprises a unit adapted to be mounted on a wall with a portion communicating through a window into the interior. The unit has a separate collector area, facing outward and a heat storage area. Two separate ducts communicate through the window. A three position fan is selectable to circulate air in one position from storage to interior, in a second position from collector to interior, and in a third position from collector to storage.

In a design of the unit such as that of the preferred embodiment, the fan may be a single fan mounted in a rotatable cylinder.

Other objects, features, characteristics and advantages of this invention will be apparent upon consideration of the following detailed description of the present preferred embodiment of the invention, as illustrated in the following drawings.

BRIEF SUMMARY OF THE DRAWINGS

FIG. 1 shows the unit standing alone from an oblique angle.

FIG. 3 shows the fan as mounted.

FIG. 4 illustrates the selectable positioning of the fan and the resulting air circulation.

DESCRIPTION OF THE PREFERRED EMBODIMENT

Figure 2:
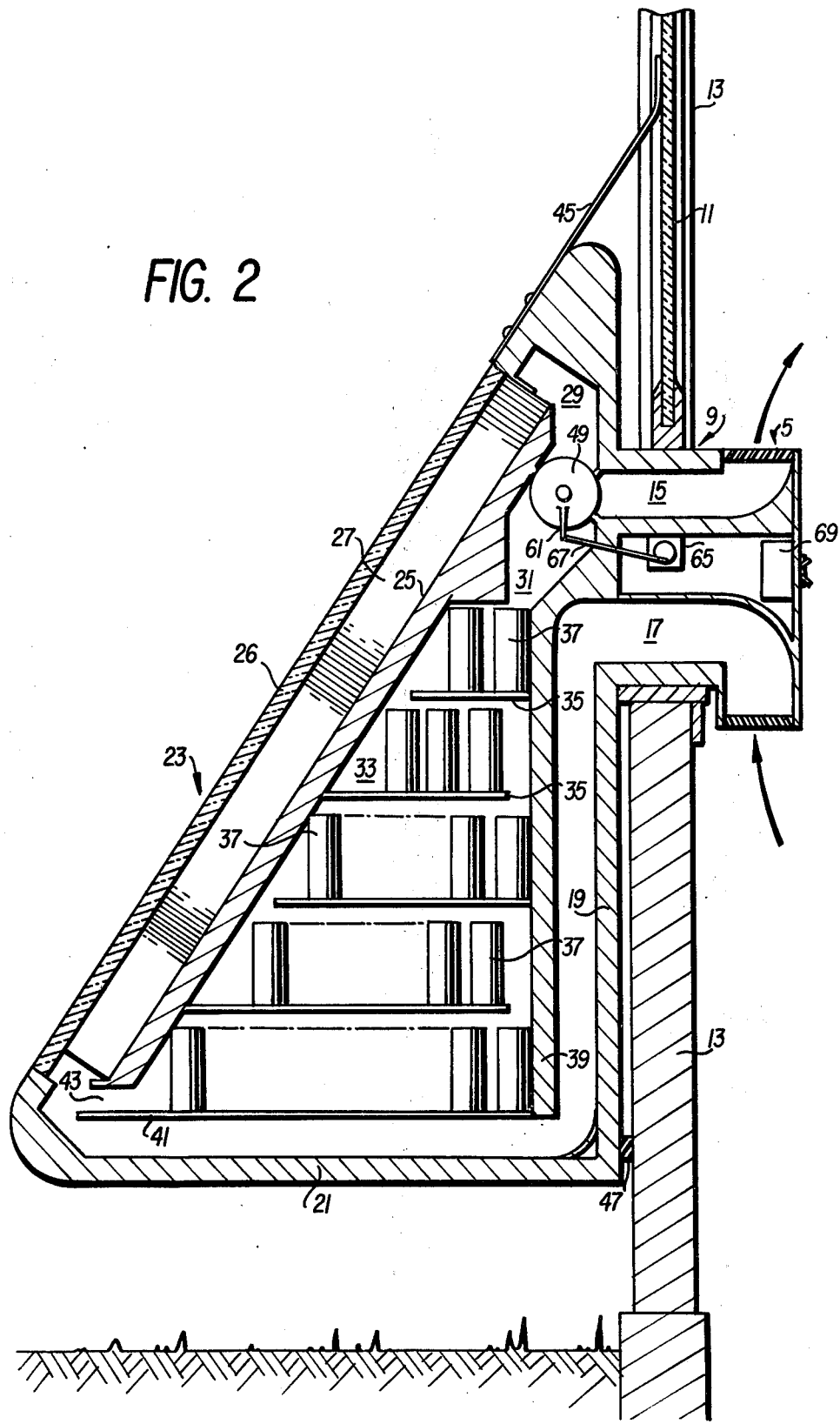
FIG. 2 shows the unit mounted and in cross section.

As FIG. 1 illustrates, the solar heater of this invention is a unitary structure having a main body 1 adapted to be mounted on the outside of a building, with an inside body 3 having air vents 5 and controls 7.

FIG. 2 shows the unit mounted. A narrow neck 9, which must typically be two inches long or more so as to extend through the opening of a window 11 and across a wall 13, contains a first duct 15 and a second duct 17, spaced from the first duct 15. Duct 15 opens at the vents 5 to discharge heated air into the interior of the building. Duct 17 opens at vents (not shown) similar to vents 5 on the bottom of inside body 3 to draw in cool air from the interior. Duct 17 extends down the inside of vertical side 19 of the unit, across the inside of the bottom 21 of the unit, to communicate with the area at the bottom of collector 23.

Collector 23, as such, may be of any standard or suitable design. In this preferred embodiment a back, support wall 25 is spaced five inches from a transparent, heat insulative cover 26. Positioned entirely within the space between back wall 25 and cover 26 is a plate 27 of thin aluminum. Plate 27 is fashioned into a regular zig-zag and, accordingly, would so appear in cross section when viewed from the bottom or the top ends of collector 23. When viewed from the side as shown in FIG. 2, the zig-zag configuration does not appear. The plate 27 is five inches high, with angles of the zig-zag each being 60 degrees, and with the long, straight sides of the channels formed by the zig-zag configuration extending substantially entirely across the face of collector 23. The top surface of plate 27 is painted with a non-reflective black paint, which inherently and automatically transforms sunlight into heat.

At the other end of collector 23, a duct 29 extends downwardly to a point intersecting duct 15. Similarly a duct 31 extends from that intersection to the top of a heat-storage chamber 33.

Heat-storage chamber 33 has a triangular cross section when viewed from the side and takes up most of the space between the collector 23 and the bottom 21 and lower side 19 of the unit. Within the chamber 33 a series of shelves 35 extend alternatively from one side and then the other, On the shelves are seated a number of cylinders 37, each generally the size of a 2½ inch diameter soft drink can, which are spaced from one another so that air will flow around and between them. The alternative termination of the shelves 35 shortly before reaching the sides of the chamber creates a serpentine path by which air flowing through the chamber is directed across all of the layers of cylinders 37.

The cylinders contain a commercially available paraffin wax, a material which naturally stores heat. That material has been found to give excellent heat-storage response within the various ranges experienced with solar collectors employed in conditions as widely found in the United States of America. The cylinders are simply mounted in place and air is flowed around them, as described specifically here with respect to the instant invention.

The back wall 39 of heat-storage chamber 37 also forms one side of part of the second duct 17, while the front wall is the same structural member as the back wall 27 of the collector. The bottom wall 41 extends to near the front side of the unit and is spaced down from plate 25, thereby forming a duct 43 leading from the bottom of the heat-storage chamber 33 into collector 23 and duct 17.

To facilitate mounting the unit suitably against the wall of a building, the top, outer part of the unit has an adjustable seal plate 45, and the bottom inside of the unit has a resilient bumper strip 47. The unit when mounted disposes the collector 23 at about 40 degrees up from the vertical, so that it presents its absorber face more directly to the sun. The triangular area under the collector 23 is primarily occupied by the heat-storage chamber 33. (Of course, the exact angle of the collector is not critical, but it should be no more than 90 degrees as a larger angle would cause the collector to be largely obscured until the sun is quite high.)

The fan cylinder 49 is located at the intersection of the top three ducts 15, 29, and 31. The fan 51 and fan assembly are shown in detail in FIG. 3. Fan 51 in the preferred embodiment is a standard, commercially available one which research indicates is known in the art as a cross-flow (or transverse or tangential) fan or blower. Such a fan has a squirrel-cage rotor and a closely spaced housing at the output which directs air away from the rotor. Air enters the rotor by suction from the other areas of the rotor where there is no closely spaced housing.

Fan 51 is firmly mounted in the middle of cylinder 49 with its output directed toward an open port 53 on the side of the cylinder. On the opposite side of the cylinder 49 a similar port 55 is located. Cylinder 49 is otherwise closed to air flow, although wires 57 to the motor of fan 51 are run through one end of cylinder 49. Cylinder 49 has a central, outwardly extending pivot rod 59 on each end, and it has a single, outwardly extending arm 61 on one side for positioning of the cylinder 49.

The mounting and positioning of cylinder 49 is shown in FIG. 4. Cylinder 49 is held in place by contact with the sides of the three ducts 15, 29, and 31. An elastomeric seal 63 is positioned at each contact point to prevent air from escaping past those points. As shown in FIG. 4, when the cylinder 49 is in its far counterclockwise position, air is circulated through duct 31 at the top of heat-storage chamber 33, through duct 15 to the interior of the building, and through duct 17 into the other end of the heat-storage chamber 33. When cylinder 49 is moved clockwise to its next position, air is circulated through duct 29 at the top of collector 23, through duct 15 to the interior of the building, and through duct 17 into the other end of collector 23. When cylinder 49 is moved farther clockwise to its third position, air is circulated through duct 29 at the top of collector 23, through duct 31 at the top of heat-storage chamber 33, through chamber 33 to duct 43 at the other side of collector 23.

Finally, FIG. 2 shows a small, three stage step or gate motor 65, connected physically by a link 67 to the arm 61 of cylinder 49. Internal control mechanism 69 is shown illustratively within unit body 3, and external controls 7, which typically are dials and switches, adjust the setting of the internal control mechanisms 69. Operation of the unit may be largely manual or automatic. For automatic control temperature sensors (not shown) are preferably located at the collector 23, at the heat-storage chamber 33, and within the building being heated. The automatic control mechanism may be entirely conventional, such as relay or solid state logic, to thereby cause the unit to function as desired in accordance with the settings of the external controls 7.

Operation

In either manual or automatic operation, when the collector 23 is producing adequate heat as currently desired, the fan cylinder 49 is placed by motor 65 in the intermediate setting and heat is thereby extracted from collector 23 and expelled into the building from top vents 5 through duct 15. Cool air is simultaneously drawn in through similar, bottom vents (not shown) and through duct 17.

Should, for example, the sun be clouded, but heat-storage chamber 33 have sufficient heat, cylinder 49 is moved to its far counterclockwise position by motor 65. In an automatic mode this temperature difference might be sensed by a continuous automatic comparison of the temperatures shown by sensors at collector 23 and chamber 33. When cylinder 49 is in the far counterclockwise position, air is expelled through duct 15 which has been heated by being drawn through chamber 33. Cool air from duct 17 enters the bottom of chamber 33 through duct 43.

A third condition is when heat being produced by the collector 33 is greater than desired in the building. In this case, fan cylinder 49 is rotated to its far clockwise position by motor 65. Air is then thereby circulated between collector 23 and chamber 33, through ducts 29, 31, and 43. The material in cylinders 37 simply absorbs and stores the heat energy.

The unit as a whole is mounted directly on a wall 13 by being positioned next to the wall 13 with the neck 9 of the unit extending through the window and serving as a hook holding the unit in place. The movable sash of window 11 is closed down on the top of neck 9 and seal plate 45 at the top is adjusted to rest against the window or wall which it intersects. The bumper strip 47 near the bottom of the main body of the unit protects the wall 13 where the unit tends to pivot against it. Although the unit happens to be illustrated located close to the ground, it may, of course, be at any elevation.

It will be apparent that this invention can take many different forms and yet be within the spirit and substance of the contributions herein disclosed. Accordingly, patent coverage should not be limited to the present preferred form here described, but should be as provided by law, with particular reference to the accompanying claims.

What is claimed is:

1. A window-mountable, solar-heating unit comprising a solar heat collector in a body adapted to be mounted on the outside of a building, a heat-storage chamber containing material which extracts and stores heat, a first duct communicating with one side of said collector and one side of said chamber, a second duct communicating with another side of said collector and another side of said chamber, said first and second ducts extending away from said body at least about one and one-half inches, and being open at locations past said extension, so that said entire unit can be mounted with said openings of said ducts inside a building with said extension positioned through a window in the wall of said building and said collector mounted outside said wall; and fan means in said unit selectable to circulate air from said collector to said storage chamber in one selected status; from said storage chamber to one of said ducts in a second selected status, and from one of said ducts across said collector to the other duct in a third selected status.

2. A solar unit as in claim 1 in which said storage chamber is positioned next to said collector and the side of said unit away from the collector is adapted to be positioned against the outside of a building wall when mounted, said collector unit being positioned when said unit is mounted to make an angle of at least 30 degrees and not more than 90 degrees from the vertical with directly downward being considered zero degrees.

3. The solar unit as in claim 1 also comprising a duct to one side of said collector and a duct to said storage chamber which intersect at an opening at said first duct, and wherein said fan means comprises a positionable fan located at said intersection which may be positioned to force air between any two of said intersecting ducts.

4. The solar unit as in claim 3 in which said fan is a cross-flow fan and is positioned in a rotatable cylinder with generally opposing openings in said cylinder.

5. A solar unit as in claim 4 in which said storage chamber is positioned next to said collector and the side of said unit away from the collector is adapted to be positioned against the outside of a building wall when mounted, said collector unit being positioned when said unit is mounted to make an angle of at least 30 degrees and not more than 90 degrees from the vertical with directly downward being considered zero degrees.

6. A window-mountable, solar heating unit adapted to be mounted on a generally vertical wall with an extension containing first and second ducts positioned through a window into the interior of a building, said unit when mounted having a generally triangular cross section on the side out of the building and having a solar collector positioned at an angle away from the wall upward from the ground of at least 30 degrees, said unit also comprising a heat-storage chamber containing material which extracts and stores heat and fan means selectable to circulate air from said collector to said storage chamber in one selected status, from said storage chamber to one of said ducts in a second selected status, and from one of said ducts across said collector to the other duct in a third selected status.

7. The solar unit as in claim 6 in which said first duct extends to a location which intersects with a third duct and a fourth duct, said third duct extending to and communicating with one side of said collector and said fourth duct extending to and communicating with one side of said heat-storage chamber, and in which said second duct extends across the side of said unit away from said collector and across the bottom of said unit to communicate with another side of said collector and another side of said heat-storage chamber, said heat-storage chamber being located between said collector and the side of said unit away from said collector.

8. The solar unit as in claim 7 in which said fan means comprises a positionable fan located at said intersection which may be positioned to force air between any two of said intersecting ducts.

9. The solar unit as in claim 8 in which said fan is a cross-flow fan and is positioned in a rotatable cylinder with generally opposing openings in said cylinder.

* * * * *